(12) United States Patent
Martin

(10) Patent No.: US 10,887,541 B2
(45) Date of Patent: Jan. 5, 2021

(54) GUN FIRE LOCATION APPARATUS, SYSTEM AND METHODS OF OPERATING THE SAME

(71) Applicant: Jordan Martin, Machesney Park, IL (US)

(72) Inventor: Jordan Martin, Machesney Park, IL (US)

( * ) Notice: Subject to any disclaimer, the term of this patent is extended or adjusted under 35 U.S.C. 154(b) by 0 days.

(21) Appl. No.: 15/880,057

(22) Filed: Jan. 25, 2018

(65) Prior Publication Data

US 2018/0213179 A1    Jul. 26, 2018

Related U.S. Application Data

(60) Provisional application No. 62/450,798, filed on Jan. 26, 2017.

(51) Int. Cl.

| | |
|---|---|
| *F41H 13/00* | (2006.01) |
| *H04N 5/77* | (2006.01) |
| *H04N 5/232* | (2006.01) |
| *G11B 27/19* | (2006.01) |
| *G06K 9/00* | (2006.01) |
| *H04N 9/82* | (2006.01) |
| *H04N 9/80* | (2006.01) |

(52) U.S. Cl.
CPC .......... *H04N 5/77* (2013.01); *G06K 9/00771* (2013.01); *G11B 27/19* (2013.01); *H04N 5/23245* (2013.01); *H04N 9/8205* (2013.01)

(58) Field of Classification Search
USPC ................. 386/227, 228, 226, 224, 239
See application file for complete search history.

(56) References Cited

U.S. PATENT DOCUMENTS

| | | | |
|---|---|---|---|
| 8,117,778 B2 | 2/2012 | Clark et al. | |
| 8,458,944 B2 | 6/2013 | Houde-Walter | |
| 8,887,430 B2 | 11/2014 | Wichner | |
| 9,335,109 B2 | 5/2016 | Bensayan et al. | |
| 9,380,397 B2 | 6/2016 | Kane et al. | |
| 9,752,840 B1* | 9/2017 | Betro | H04W 4/029 |
| 2006/0082730 A1 | 4/2006 | Franks | |
| 2015/0253109 A1 | 9/2015 | Wichner | |
| 2015/0254968 A1 | 9/2015 | Sanders et al. | |
| 2015/0285593 A1* | 10/2015 | Dribben | F41J 5/10 434/19 |
| 2015/0347079 A1 | 12/2015 | Price et al. | |

(Continued)

*Primary Examiner* — Daquan Zhao
(74) *Attorney, Agent, or Firm* — Vedder Price P.C.

(57) ABSTRACT

Apparatus, systems and methods for monitoring a firearm discharge by using a discharge tracking device attached to a firearm, the device comprising a monitoring unit having a processor and a memory coupled to an input-output unit, a plurality of sensors including an accelerometer, a microphone, a gyroscope and a camera communicatively coupled to the input-output unit of the monitoring unit, a wireless communication interface configured to communicate with at least one other discharge tracking device. The memory is configured to store data from the plurality of sensors including video from the camera and audio from the microphone and the processor is configured to determine the discharge of the firearm by processing and interpreting signals generated by the plurality of sensors including video from the camera and audio from the microphone and transmitted via the discharge tracking device.

11 Claims, 3 Drawing Sheets

(56) References Cited

U.S. PATENT DOCUMENTS

| | | |
|---|---|---|
| 2016/0033221 A1 | 2/2016 | Schmehl et al. |
| 2016/0165192 A1 | 6/2016 | Saatchi et al. |
| 2016/0169603 A1* | 6/2016 | Stewart .................. F41A 17/06 42/1.01 |
| 2016/0216082 A1* | 7/2016 | Downing .................. F41G 3/04 |

* cited by examiner

GUN FIRE LOCATION APPARATUS, SYSTEM AND METHODS OF OPERATING THE SAME

CROSS REFERENCE TO RELATED APPLICATIONS

This application claims the benefit and priority from U.S. Provisional Patent Application Ser. No. 62/450,798, filed Jan. 26, 2017 for "GUN FIRE LOCATION SYSTEM AND METHODS OF OPERATING THE SAME," the disclosure of which is incorporated herein by reference in its entirety.

FIELD OF THE INVENTION

The disclosure and various invention embodiments relate to apparatus, systems and methods for monitoring and tracking the discharge from a firearm. More specifically, the present invention relates to using a discharge tracking device to track the discharge from a firearm by reading, storing and analyzing information and data collected from multiple sensors attached to the discharge tracking device for at least one or more firearms.

BACKGROUND

Police officers in their line of duty are often faced with incidents and events where they may use firearms in order to diffuse or address certain situations related to such events and incidents. More often than not, gathering post-incident information for further investigation related to a particular incident or event can be very challenging. Many police departments require officers to wear video cameras to document the activities carried out by each officer during their shift. Police departments and other law-enforcement related investigations are increasing deploying technologies to both collect evidence and improve officer accountability. However, current video and body camera devices sometimes malfunction and can be tampered with easily. Further, the information obtained from these devices is not tailored to allow for the accurate determination of whether a gun was discharged, who discharged a gun and how many rounds were fired in relation to a particular police incident.

In many police incidents, knowing the order of firearm discharges or shots fired is important in recreating and analyzing the event. Officers facing imminent threats to themselves or public safety do not have enough time to analyze a given scenario before reacting to diffuse or address such threats. Further, incidents are analyzed differently based on the context of the situation in which the officers find themselves in the line of duty. For example, an officer responding to shots being fired at the officer is handled differently than a situation where an officer shoots first. In such scenarios, knowing where the officer directed his gun or who fired the first shot and whether other officers similarly situated also fired their weapons helps to build a more accurate picture for post-incident or post-event investigation. Using current video technology to recreate events based on firearm discharges is rather difficult, cumbersome and produces inaccurate results. Therefore, a need exists for efficiently and accurately determining the sequence of events and minimizing errors in post-incident or post-event investigations when a firearm has been discharged during a particular event. Further, there is a need to determine the correct sequence of firearm discharges in police operations for incidents involving multiple firearms in order to obtain accurate post-incident or post-event analysis for a certain police incident.

SUMMARY

In one aspect of the present disclosure, a system, apparatus and method for tracing a firearm discharge may include a firearm discharge tracking device attached to a firearm. In another aspect of the present disclosure, the device may include a monitoring unit having a processor and a memory coupled to an input-output unit, a plurality of sensors including an accelerometer, a microphone, a gyroscope and a camera communicatively coupled to the input-output unit of the monitoring unit. In addition, the device may be configured with a wireless communication interface to communicate with at least one other discharge tracking device in the vicinity of other discharge tracking devices related to a particular incident. The memory within the monitoring unit of the discharge tracking device may be configured to record real-time data related to a discharge of at least one or more of the firearms and the processor is configured to determine the discharge of at least one or more of the firearms by processing and interpreting real-time data generated by the plurality of sensors.

BRIEF DESCRIPTION OF THE DRAWING

Details of the present invention, including non-limiting benefits and advantages, will become more readily apparent to those of ordinary skill in the relevant art after reviewing the following detailed description and accompanying drawings, wherein.

DETAILED DESCRIPTION OF THE DISCLOSURE

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

Figure 1:
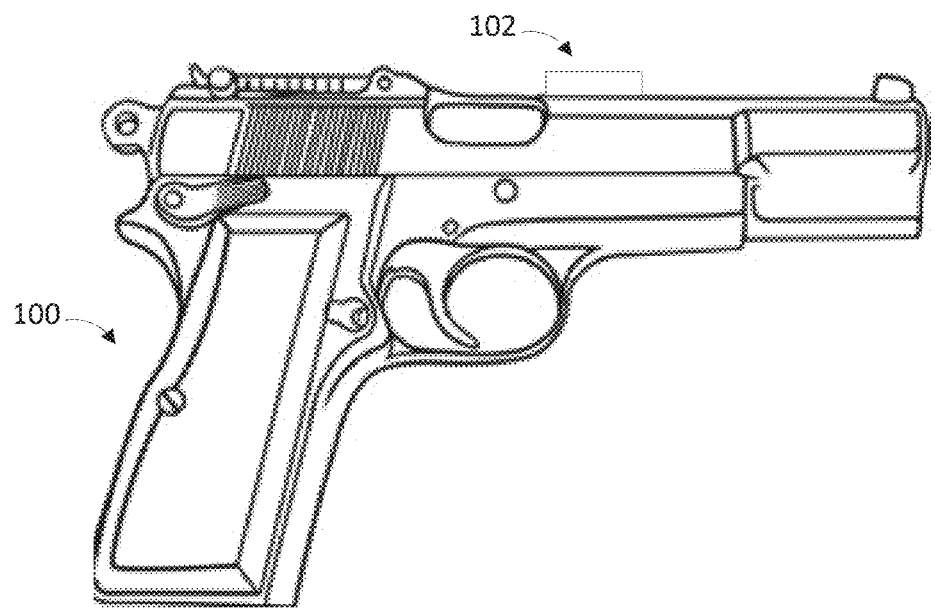
FIG. 1 depicts a firearm with a discharge tracking device mounted onto the firearm.

FIG. 1 depicts a firearm 100 with a discharge tracking device 102 mounted onto the firearm 100. The discharge tracking device 102 may be mounted at any location on the firearm 100. In an embodiment, the discharge tracking device 102 is detachably attached to a bracket mounted on an upper side of the firearm 100. The discharge tracking device 102 is mounted such that an aperture for a camera is generally aligned with the barrel of the firearm 100 with the sight of the firearm 100 in view.

Figure 2:
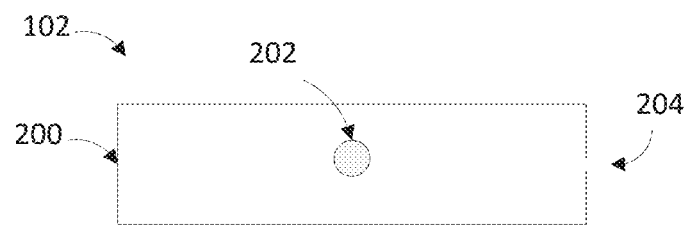
FIG. 2 depicts a top view of the discharge tracking device.

FIG. 2 depicts a schematic top view of the discharge tracking device 102. A housing 200 houses components of the discharge tracking device 102 and has a lower side 206 configured and adapted for selective detachable mounting and removal on the firearm 100, such as, by a quick release mechanism, assembly or system, rail, hinge-lock or the like, etc. The housing 200 has a first side 208 having at least one first aperture 202 sized to accommodate appropriate registration with or exposure for a sound sensor such as a microphone or the like, etc., and a second aperture 204 on the second side of the housing 200 that is sized to accommodate a camera 312 to view outside the housing 200 and aligned with the second aperture 204.

In an embodiment, a third aperture (not shown but similar to either first or second aperture and understood by one having ordinary skill in the art) is formed to accommodate a light detection sensor and facilitate its exposure to the outside environment. Preferably in one embodiment, the third aperture for the light detection sensor is arranged on the discharge tracking device 102 such that no light is detected by the light detection sensor when the firearm 100 is in a non-operative and stored condition (e.g. in a holster) and light is detected by the light detection sensor when the firearm 100 is in an operative condition or state (e.g. when the firearm is upholstered and ready for use).

In an embodiment, when the firearm 100 is holstered or in a non-operative condition and state, the discharge tracking device 102 powers off or enters into a low power state to conserve battery life. In another embodiment, the discharge tracking device may include an on button. The button can be used to send a signal in order to disable the data tracking functionality of the discharge tracking device 102 during training and maintenance.

Figure 3:
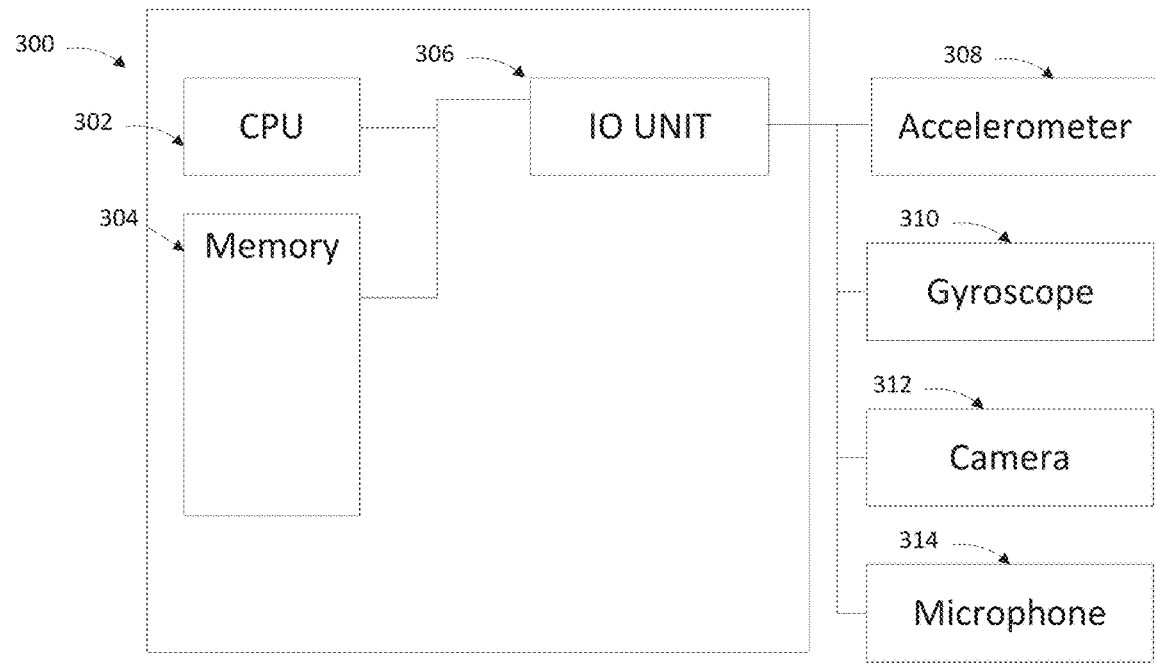
FIG. 3 shows a more detailed depiction of the discharge tracking device.

FIG. 3 shows a more detailed depiction of the components of the discharge tracking device 102. The discharge tracking device 102 comprises a monitoring device 300 that includes a processor (Central Processing Unit or CPU) 302, a memory unit 304, and an input output (IO) unit 306. A plurality of sensors including a accelerometer 308, gyroscope 310, camera 312 and microphone 314 are communicatively connected to the IO Unit 306. The memory 304 is configured to store data from the sensors including video from the camera 312 and audio from the microphone 314.

Figure 4:
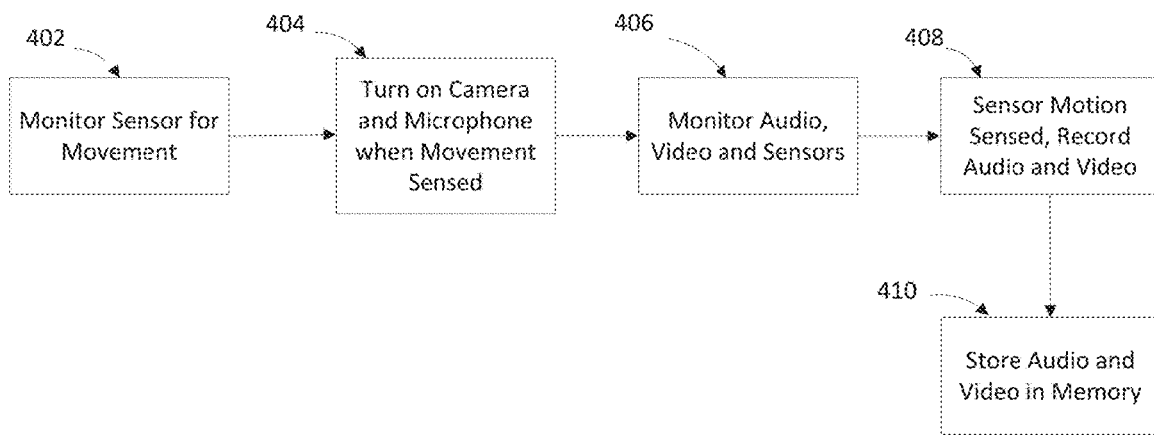
FIG. 4 depicts an illustrative example of the operation of the discharge tracking device.

FIG. 4 depicts an illustrative example of the operation of the discharge tracking device 102. In step 402, embedded software operating in the processor 302 monitors the sensor readings from the IO Unit 306. In an embodiment, the processor 302 monitors the accelerometer 308 for movement indicating that the firearm 100 is being moved from its holstered or stored position. In another embodiment, the accelerometer 308 and gyroscope 310 are monitored to determine the position of the firearm 100.

As illustrated in FIG. 4, the processor 302 monitors the plurality of the sensors in step 402 and turns on the camera 312 and microphone 314 when a movement of the firearm based on the sensor readings is sensed by the discharge tracking device 102. Further, the sensor readings or data from the audio and video is transferred to the memory 304 in the discharge tracking device 102. In step 406, the processor 302 analyzes the audio, video and other sensor readings for audio patterns that would indicate the firearm 100 has discharged.

In an embodiment, the processor 302 within the monitoring unit 300 may monitor the audio from the microphone 314 for a sound pattern that matches the audio pattern of a firearm 100 discharging. In another embodiment, the processor 302 may analyze data from the accelerometer 308 and gyroscope 310 for movement indicative of recoil from the discharge of the firearm. In another embodiment, the processor 302 may be able to identify an audio pattern indicating the discharge of a firearm 100, followed by a second audio pattern indicating the discharge of another firearm 100, related to a particular police incident, along with accelerometer 308 and gyroscope 310 readings indicating the discharges of multiple firearms.

As illustrated in FIG. 4, in step 408, when the audio, video or sensor information indicates the discharge of a firearm 100, the processor 302 captures all audio, video and sensor information and stores the data in the memory 304. In an embodiment, the audio and video recording for the discharge tracking device are performed in a loop such that a predetermined time of audio and video before the incident and a predetermined time of audio and video after the incident can be recorded. The sensor information collected by the processor 302 may include the acceleration of the firearm 100 along three axis (accelerometer 308) and the position of the firearm along three axis (gyroscope 310). In step 410, the captured data is continuously stored in the memory 304.

Figure 5:
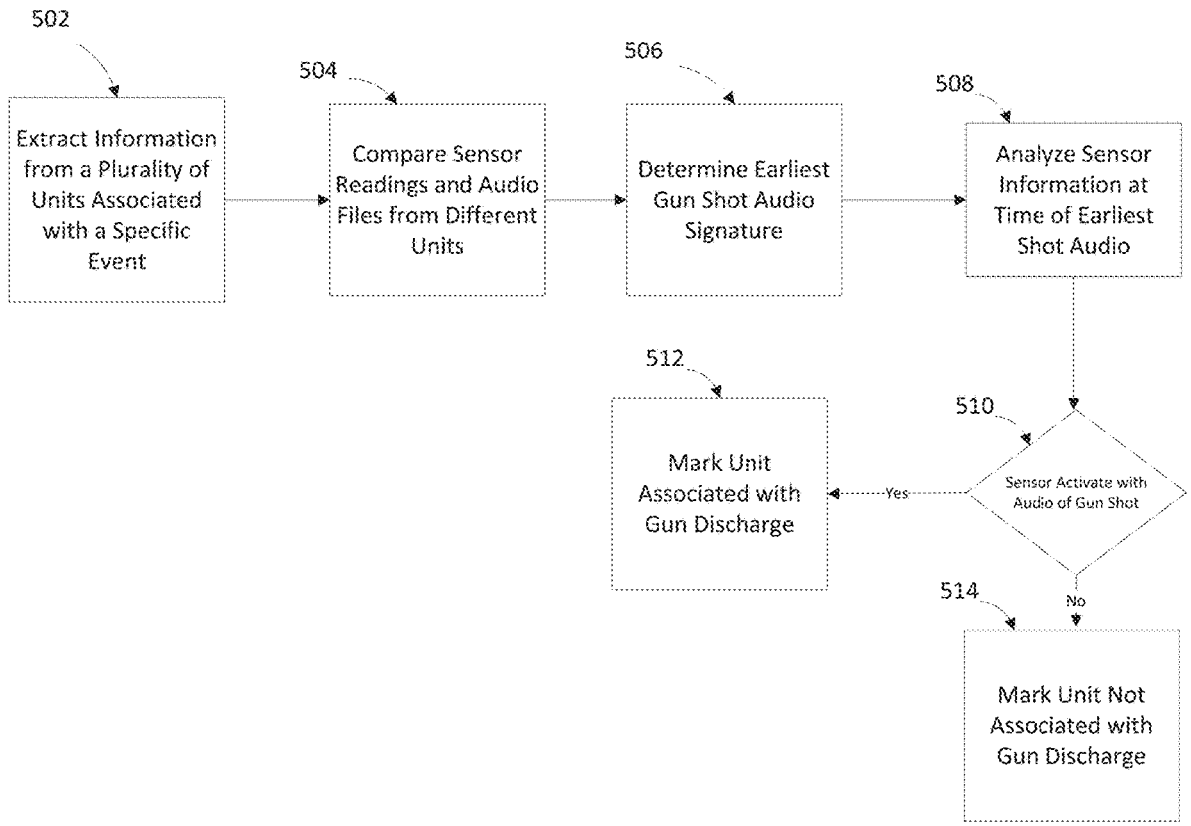
FIG. 5 depicts an illustrative example of the of the analysis of data or information gathered by the discharge tracking device.

FIG. 5 depicts an illustrative example of analyzing the data or information gathered by the discharge tracking device 102 during operation of multiple firearms 100. In step 502, data is extracted from a plurality of discharge tracking devices 102 that are associated with multiple firearm discharges during a certain event. In step 504, readings from each sensor and audio recordings of each discharge tracking device 102 are compared by the processor 302 of the monitoring unit 300. In step 506, the first instance of a gunshot is determined from the audio files by examining the captured audio signatures and comparing them to signatures from known gun shots.

In an embodiment, the sound intensity of the gun shot may be used to determine a relative distance and direction from the discharge tracking device 102 recording the audio file. In step 508, the sensor data from each discharge tracking device 102 is analyzed to identify any sensor reading indicating the discharge of a firearm 100. In step 510, the audio information is matched with other sensor data to determine whether the sensor information corresponds to the recorded audio. In step 512, if the audio and sensor information from a discharge tracking device 102 indicate that the firearm 100 with the corresponding discharge tracking device 102 is discharged, the firearm 100 is marked as the discharging firearm. This information can also be confirmed by analyzing the audio files and sensor readings (reading and processing the data by the monitoring unit of the discharge tracking device) of the other discharge tracking devices 102 associated with multiple firearms 100 during a particular event.

In an embodiment, the number of rounds fired can be determined by analyzing all the audio and sensor data collected by the processor 302. In addition, the order in which the firearms were discharged or shots were fired can be determined by synchronizing the readings from multiple discharge tracking devices 102. In step 514, if the sensor reading and the data in the audio file in a discharge tracking device 102 does not indicate the firearm 100 as being discharged, the firearm 100 is then identified as not the discharging firearm.

In an embodiment, each discharge tracking device 102 includes an internal clock in the CPU 302 configured to store the time and date. To conserve battery life, each discharge tracking device 102 is capable of entering a dormant or non-operative state where all the critical functions are turned off. Consistent with this embodiment, the internal clock value within the discharge tracking device will continue to update in the dormant or non-operative mode.

In an embodiment, the discharge tracking device 102 includes a wireless interface that allows each discharge tracking device 102 to communicate with other discharge tracking devices 102 in the vicinity. A wireless communication interface having a wireless transmission circuit connected to the processor where the wireless transmission circuit is configured to enable wireless transmission of transmitted data from the processor to at least one other discharge tracking device 102 is housed inside the discharge tracking device 102. Using the wireless communication interface, the discharge tracking device 102 may synchronize its internal clock with other discharge tracking devices 102. The connection with an adjacent discharge tracking device 102 can be achieved through any standard network protocol such as using a cellular or a proprietary wireless network.

In an embodiment, videos from multiple discharge tracking devices 102 are analyzed together. Video and audio signals are synchronized by identifying the first audio signal measured on each discharge tracking device 102 and establishing the first audio signal as the beginning point of the incident. Consistent with this embodiment the beginning point of each recording across multiple discharge tracking devices 102 can be normalized.

In an embodiment, the discharge tracking device 102 is capable of analyzing data from the plurality of other discharge tracking devices 102 by wirelessly communicating with the plurality of discharge tracking devices 102 associated with a particular event. The processor 302 can compare the audio, video and sensor readings from the plurality of discharge tracking devices and determine the first discharge by evaluating and analyzing the data from the plurality of discharge tracking devices 102. The processor 302 is further configured to compare the timing of the readings from the plurality of the sensors including the audio and video readings of the discharge tracking devices and identifying and marking a particular discharge tracking device 102 as either associated or not associated with a firearm 100 discharge during a particular incident. Specifically, identifying whether a police officer discharged a firearm 100 in response to a threat or whether a third party discharged their firearm 100 prior to an officer discharging their firearm 100 can assist in the investigation of police incidents where a firearm 100 is discharged. Further, by analyzing the audio and sensor readings an officer can be eliminated as a shooter in an incident.

Figure 6:
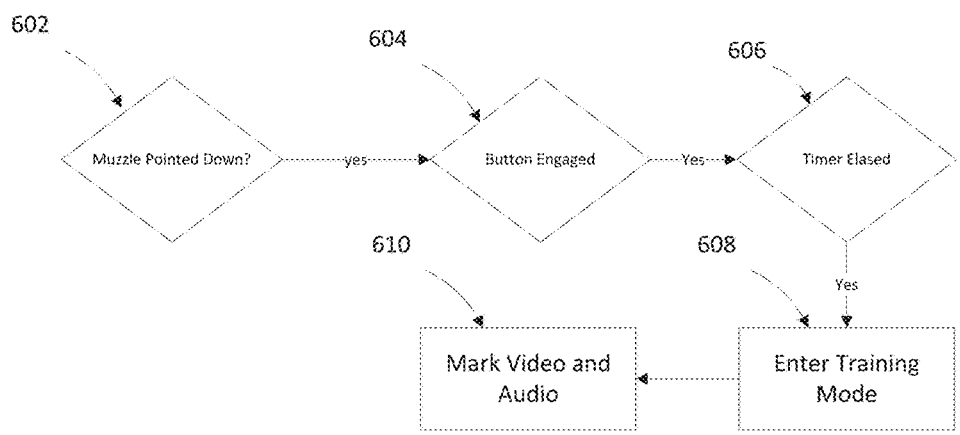
FIG. 6 depicts a schematic representation of placing the discharge tracking device into a training mode.

FIG. 6 depicts a schematic representation of placing the discharge tracking device 102 into a training mode. In step 602, the discharge tracking device 102 determines if the muzzle of the firearm 100 is pointing down. In step 604, if the muzzle is pointing down, the discharge tracking device 102 determines if the button is in an off mode. In step 606, if the muzzle is down and the button is engaged, the discharge tracking device 102 determines if a timer has elapsed. In step 608, if the timer has elapsed, the discharge tracking device 102 enters into a training mode. In step 610, the discharge tracking device 102 marks all video and audio recorded as being recorded in a training mode and not in a live mode.

In an embodiment, the wireless network may be any type of known network including wireless local area network (WLAN), global network (e.g., Internet), intranet, with data processing capabilities. Information and data for the discharging firearm may be provided by cellular based networks, from signal measurements of radio-frequency communications with the cellular network or via other infrastructures such as the Internet protocol (IP) receiving bases in a WLAN network. The discharging firearm is equipped with memory, monitoring, communication, and location related embedded chip sets and smart sensors running embedded software modules for coordination and communication between the multiple discharge tracking devices and firearms.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The apparatus, systems and methods disclosed herein may be implemented by a suitable combination of hardware, embedded software, and/or firmware. For example, various embedded software modules may be used with programs written in accordance with the instant teachings, or it may be more convenient to construct a specialized apparatus or system to perform the required methods and techniques by using a specially designed embedded software module for the multiple sensors.

Apparatus, systems and methods consistent with the instant disclosure also include computer-readable media (or memory) that include program instructions or software modules for performing various processing and device-implemented operations based on the methods and processes described herein. The program instructions may be those specially designed and constructed for the purposes of the instant disclosure, or they may be of the kind well known and available to those having skill in the computer software arts. Examples of program instructions or software modules include, for example, machine code, such as produced by a compiler, and files containing a high-level programming code that can be executed by the computer or an embedded processor.

Furthermore, although the embodiments above refer to the discharge tracking device configured to store data from each of the plurality of sensors including video from the camera and audio from the microphone and configured to determine the movement of the firearm by reading a signal generated by the plurality of sensors, systems and methods consistent with the instant disclosure may process information related to other types of sensor information. Accelerometers and gyroscopes are not limited to the present embodiments and includes standard and commonly used micromechanical systems (MEMS). In addition, accelerometers used with the present invention can be of common types that utilize capacitive sensing and the piezoelectric effect to sense displacement and provide that information to a central processing unit of a computer. Moreover, although reference is made herein to using the plurality of sensors to collect and analyze the data, in its broadest sense apparatus, systems and methods consistent with the instant disclosure may provide analyses of various types of data collected from multiple sensors attached to discharge tracking devices.

While particular preferred embodiments have been shown and described, it is to be understood that the foregoing description is exemplary and explanatory only and is not restrictive of the instant disclosure. Those skilled in the art will appreciate that changes and additions may be made without departing from the instant teachings. For example, the teachings of the instant disclosure may be directed to various combinations and sub-combinations of the disclosed features and/or combinations and sub-combinations of several features described herein. It is therefore contemplated that any and all modifications, variations or equivalents of the above-described teachings fall within the scope of the basic underlying principles disclosed above and claimed herein.

The invention claimed is:

1. A system for tracking a firearm discharge, the system comprising:
   a firearm;
   a discharge tracking device attached to the firearm, wherein the discharge tracking device includes;
   a monitoring unit having a processor and a memory coupled to an input-output unit;
   a switch to enable or disable tracking of data from the plurality of sensors attached to the discharge tracking device, wherein the plurality of sensors include an accelerometer, a microphone, a gyroscope and a camera communicatively coupled to the input-output unit of the monitoring unit;
   a wireless communication interface having a wireless transmission circuit connected to the processor configured to compare the timing of the readings from the plurality of the sensors;
   wherein the wireless transmission circuit configured to enable wireless transmission of transmitted data from the processor to another discharge tracking device attached to another firearm; wherein
   the memory of the monitoring unit is configured to record data related to a discharge of the firearm from each of the plurality of sensors, wherein the data is stored in the memory; and wherein
   the processor of the monitoring unit is configured to determine the discharge of the firearm by processing and interpreting data generated by each of the plurality of sensors and to transmit the determination via the wireless transmission circuit; and
   wherein the processor is further configured to record audio and video performed in a loop such that a predetermined time of audio and video can be recorded before and after an incident and synchronized for identifying and tracking a discharge tracking device associated with a particular fire arm incident.

2. The system of claim 1, wherein the camera has an aperture aligned with the barrel of the firearm and towards the sight of the fire arm.

3. The system of claim 1, wherein the processor is configured to record the audio and video from the respective microphone and the camera for a predetermined amount of time.

4. The system of claim 1, wherein the processor is capable of running a software module that can analyze the signals generated by the plurality of sensors including video from the camera and audio from the microphone.

5. The system of claim 1, wherein the processor is further configured to:
   read data generated by the accelerometer to detect movement of the firearm via the input-output unit;
   read data generated by the gyroscope to determine the position of the firearm via the input-output unit;
   turn on the microphone and the camera when movement is sensed from the data; and
   record and store the audio and video data in the memory of the monitoring unit for a predetermined amount of time.

6. The system of claim 1, wherein the discharge tracking device includes an internal clock to store information regarding the time and date, wherein the clock is configured to update the information when the discharge tracking device is in a dormant state.

7. A method of tracking a fire arm discharge, the method comprising:
   connecting a discharge tracking device configured with a switch to each of a plurality of firearms, each discharge tracking device having a monitoring unit and a plurality of sensors including an accelerometer, a microphone, a gyroscope, and a camera;
   communicatively coupling a processor, a memory and plurality of sensors to an input-output unit within the monitoring unit;
   analyzing the data from the gyroscope to determine the position of the firearm;
   determining when the switch is enabled or disabled;
   calculating when a certain predetermined amount of time has elapsed from a timer associated with the internal clock;
   and when the firearm is pointing downwards and the switch is disabled after the certain predetermined time has elapsed;
   configuring a wireless communication interface having a wireless transmission circuit connected to the processor to transmit data from the processor to the discharge tracking device connected to another of the firearms;
   recording data in each of the discharge tracking devices related to each discharge of the firearms from each of the plurality of sensors, wherein the data is stored in the memory; and processing and interpreting data related to each discharge of the firearms by the processor to determine the discharge status of each firearm.

8. The method of claim 7, wherein the discharge tracking device is capable of analyzing data from the plurality of other discharge tracking devices for a particular event, the method comprising the steps of:
   wirelessly communicating with the plurality of discharge tracking devices associated with a particular event;
   extracting data generated by the plurality of sensors associated with the plurality of discharge tracking devices for the particular event;
   comparing the audio, video and sensor readings from the plurality of discharge tracking devices;
   determining the first discharge by evaluating and analyzing the audio, video and sensor readings from the plurality of discharge tracking devices;
   comparing the timing of the readings from the plurality of the sensors with the audio and video readings of the discharge tracking devices; and
   identifying and marking the discharge tracking unit as either associated or not associated with the discharge during the particular event.

9. The method of claim 7, wherein the discharge tracking device is further capable of determining the number of discharges by analyzing the audio and sensor readings from a plurality of discharge tracking devices.

10. The method of claim 7, wherein the switch enable or disable the tracking of data from the plurality of sensors attached to the discharge tracking device.

11. The method of claim 7, wherein the discharge tracking device can be used in a training mode such that all the audio and video recordings are marked as being recorded in a training mode and not in a live mode.

* * * * *